United States Patent

Fearon

[15] 3,682,332
[45] Aug. 8, 1972

[54] RAIL HANDLING SYSTEM
[72] Inventor: Joseph G. Fearon, Libby, Mont.
[73] Assignee: Morrison-Knudsen Company, Inc., Boise, Idaho
[22] Filed: April 1, 1970
[21] Appl. No.: 24,583

[52] U.S. Cl. ......................214/41, 212/7, 214/85.5
[51] Int. Cl. .............................................B65g 67/12
[58] Field of Search........214/85.5, 75 H, 41, 92, 523; 212/7, 42, 44, 57, 64, 5, 73

[56] References Cited

UNITED STATES PATENTS

| | | | |
|---|---|---|---|
| 1,539,546 | 5/1925 | Deenik | 212/64 |
| 1,754,662 | 4/1930 | Woodbury et al. | 104/2 |
| 2,272,949 | 2/1942 | Kidder | 214/38 CA |
| 3,094,222 | 6/1963 | McAllister | 212/87 |
| 2,902,311 | 9/1959 | Reel | 294/87 |
| 1,001,317 | 8/1911 | Smith & Lovejoy | 104/4 |

FOREIGN PATENTS OR APPLICATIONS

| | | | |
|---|---|---|---|
| 1,405,022 | 5/1965 | France | 104/2 |
| 1,043,372 | 11/1953 | France | 104/2 |
| 207,046 | 10/1968 | U.S.S.R. | 214/85.5 |

Primary Examiner—Gerald M. Forlenza
Assistant Examiner—Lawrence J. Oresky
Attorney—Seed, Berry & Dowrey

[57] ABSTRACT

A system for simultaneously handling a plurality of ribbon rails wherein the rails are placed in a storage area in stacks of a predetermined number of rails in width. A transporting means is provided which is capable of carrying a plurality of rails equivalent to the number of rails in width of the storage stacks or a multiple thereof. There is provided a lifting and pulling device which clamps and spaces the ends of a plurality of rails in the top layer of a stack of ribbon rails and then pulls them onto the rail transporting device.

4 Claims, 12 Drawing Figures

PATENTED AUG 8 1972 3,682,332
SHEET 1 OF 4
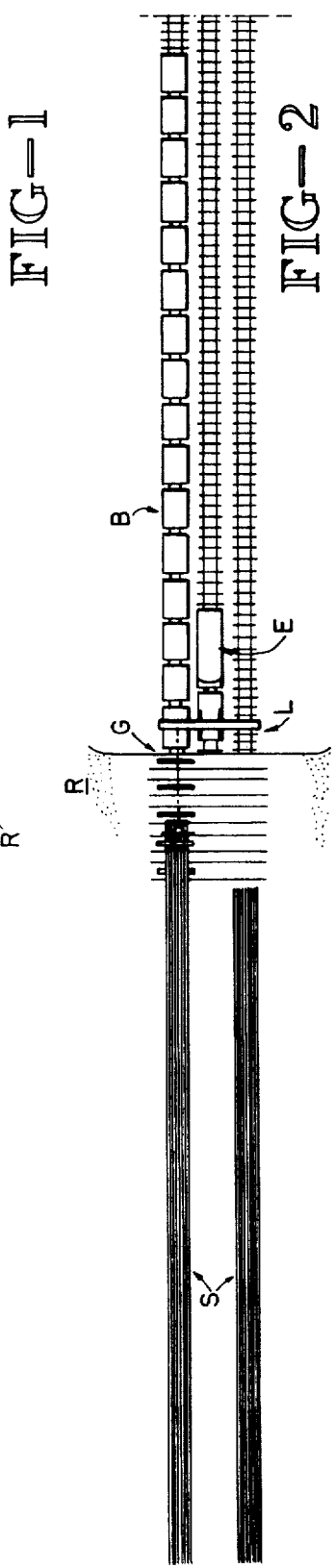
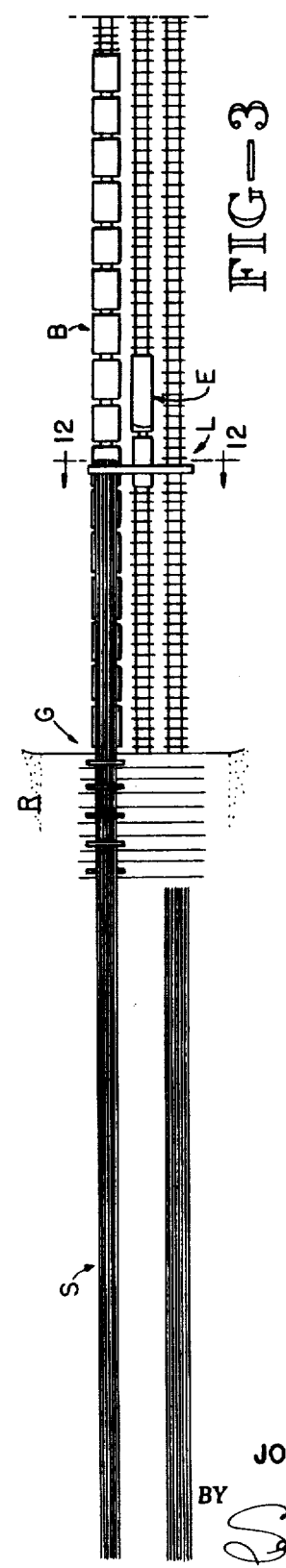
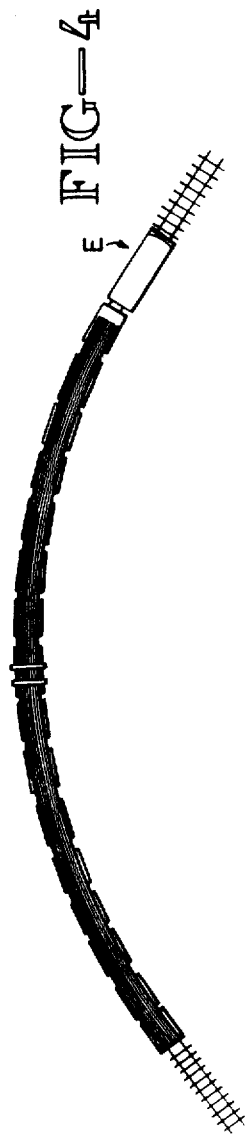
INVENTOR
JOSEPH G. FEARON
BY
*Seed, Berry & Dowrey*
ATTORNEYS

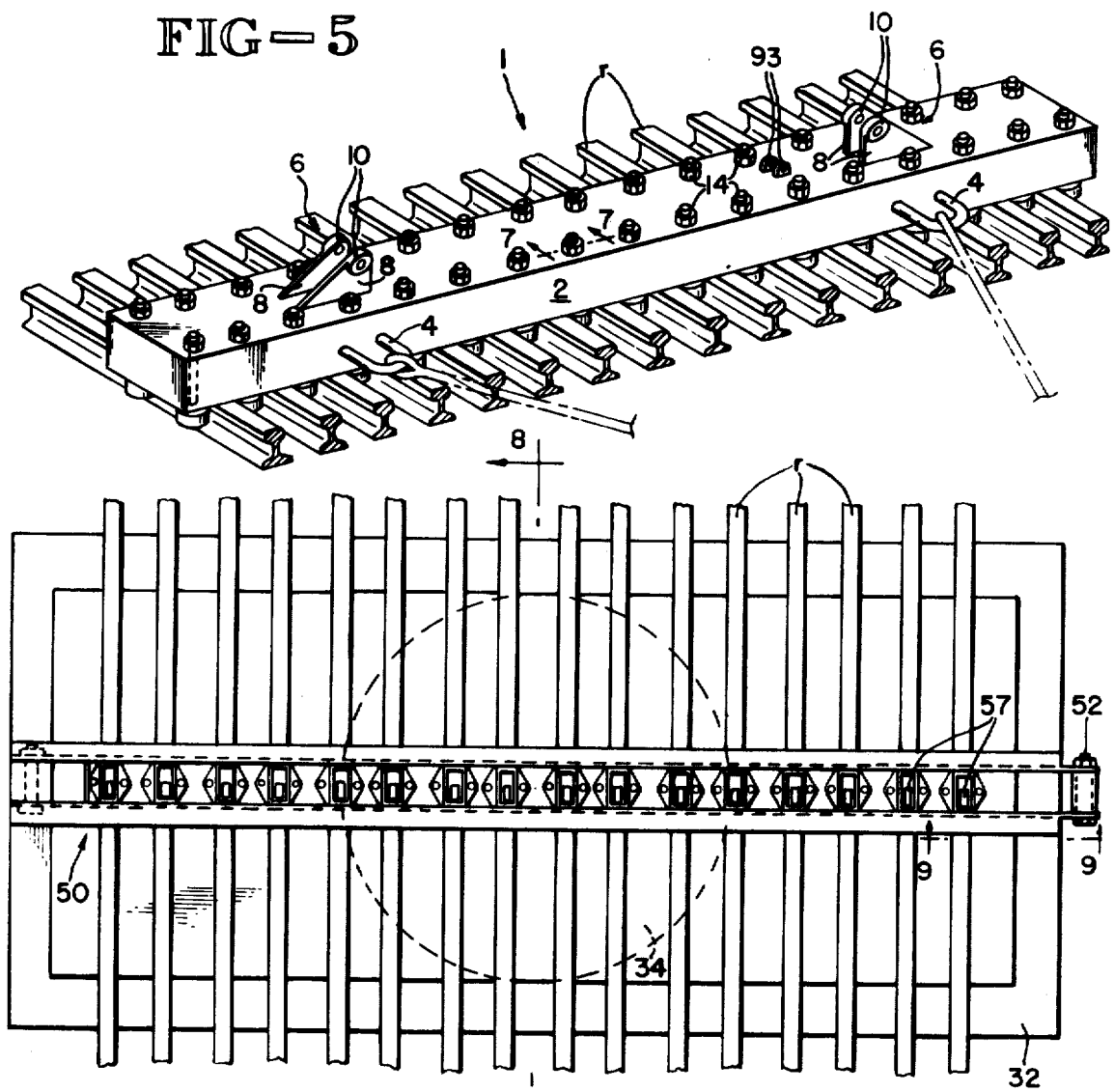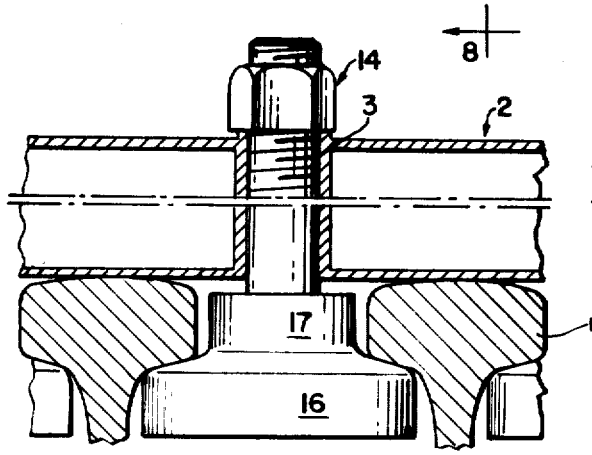

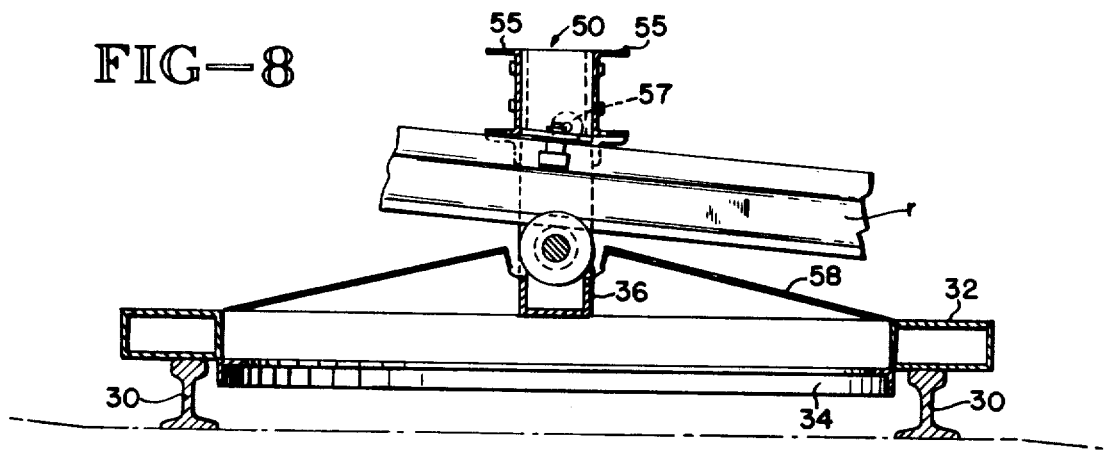
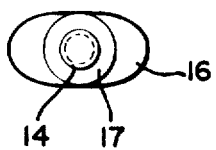
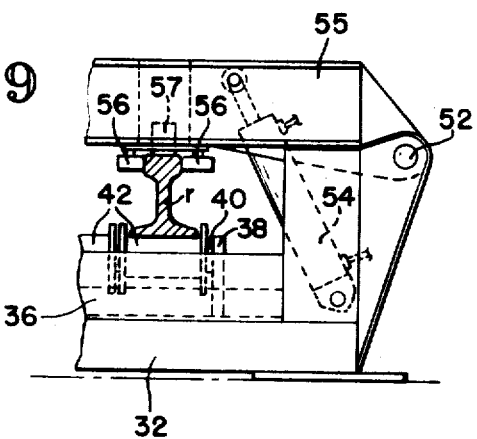
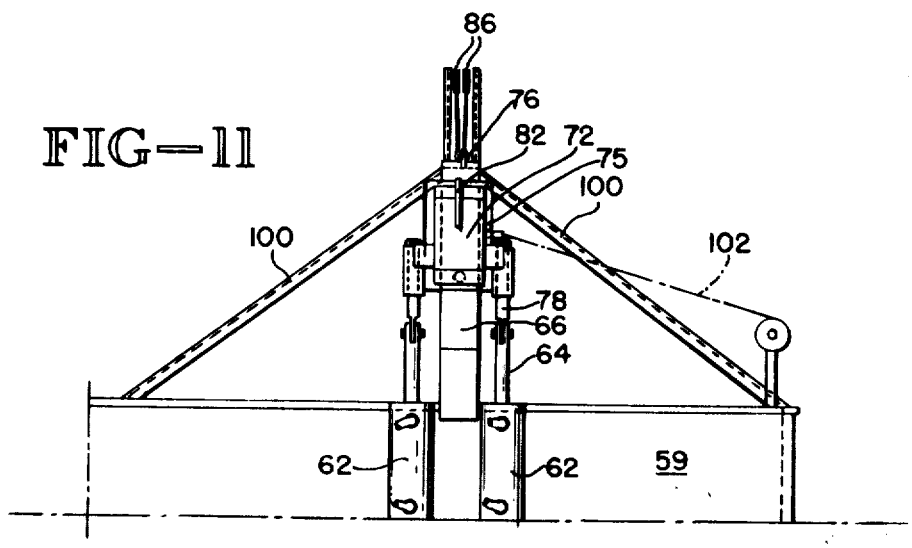

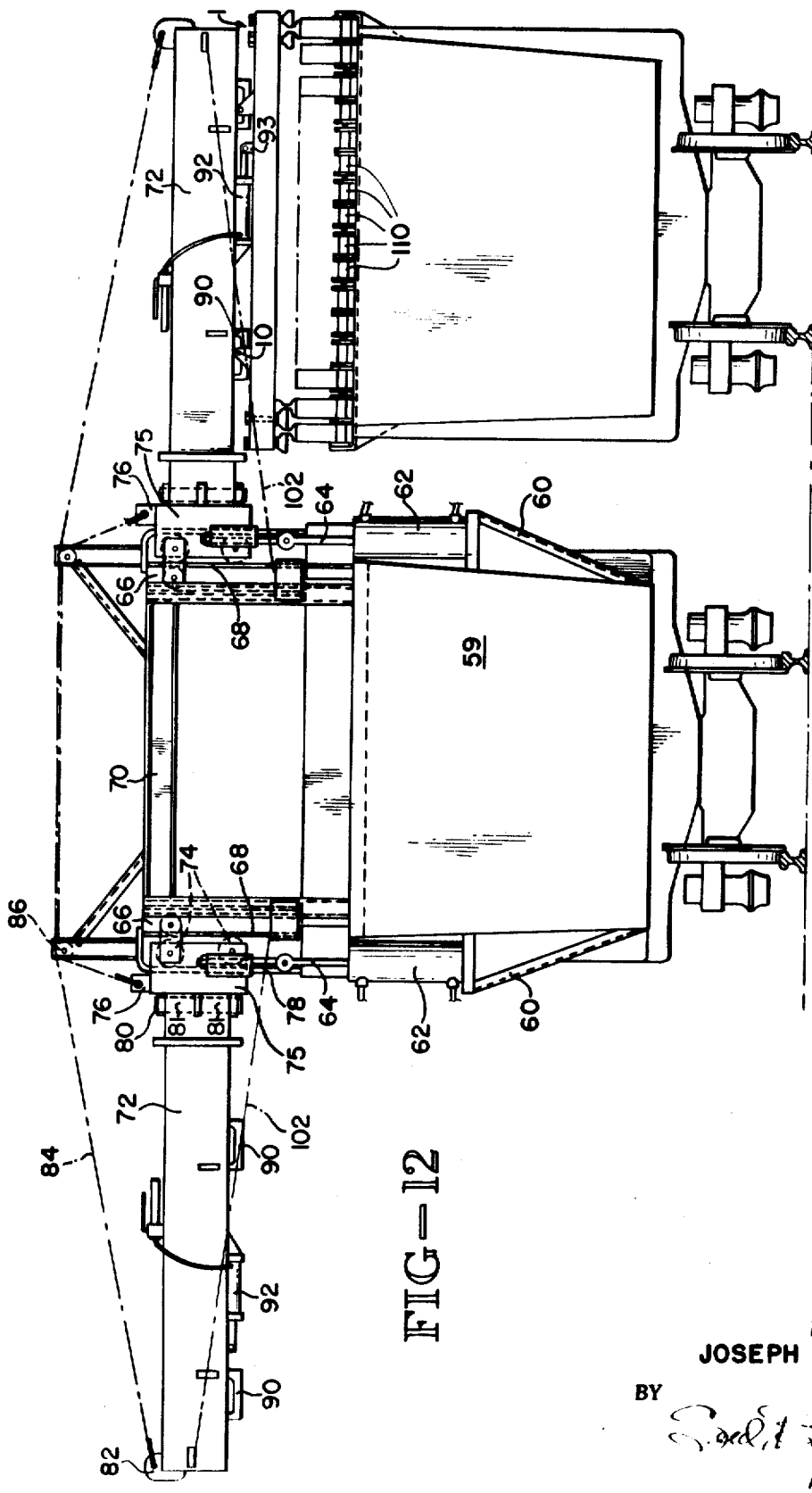

RAIL HANDLING SYSTEM

BACKGROUND OF THE INVENTION

In the interest of smooth, quiet rides for passengers and freight transported by train as well as a reduction in cost during the laying as well as maintenance of the track, many railroads are using continuous ribbon rails in their track structure. Each ribbon rail comprises a plurality of conventional rails joined in an end-to-end relation by a suitable means such as welding. A conventional section of rails is 36 feet long whereas a ribbon rail may well be a quarter of a mile in length. The advantages of using the ribbon rail are obvious but the introduction of these lengths has likewise presented problems in rail handling.

One method of economizing in the fabrication of the ribbon rails is to weld them in one central location, store them in close proximity to the welding operation and then transport them to the place of usage as they are needed.

It is the principal object of this invention to provide a novel combination of the apparatus for handling continuous ribbons of rails.

In accordance with this object and as a feature of the present invention, there is provided a rail handling system wherein a plurality of ribbon rails are simultaneously moved from a storage area onto a rail transporting means.

It is another object of the present invention to provide a system wherein a plurality of rails are lifted as a unitary layer from a storage stack and simultaneously placed upon a transporting means.

In accordance with this object and as a feature of this invention, there is provided a rail grasping apparatus which clamps the ends of a plurality of ribbon rails appropriately spaces them, and serves as an element of the means for moving the rails from the storage area onto the transporting means.

It is yet another object of the present invention to provide a system which allows the loading of a plurality of ribbon rails onto a variety of transporting means.

In accordance with this object and as a feature of this invention, there is provided a power source which is adjustable as to elevation and operation to handle a plurality of rails and load them onto transporting means of varying elevations above the ground and likewise is capable of loading onto the transporting means from either side.

The above and other features of the invention including various novel details of construction and combinations of parts will now be more particularly described with reference to accompanying drawings and pointed out in the claims.

It will be understood that the particular apparatus embodying the invention is shown by way of illustration only and not as a limitation of the invention.

The principles and features of this invention may be employed in varied numerous embodiments without departing from the scope of the invention.

BRIEF DESCRIPTION OF THE DRAWINGS

FIG. 1 is a side elevation depicting the rail handling apparatus in position to move a plurality of rails from the storage area onto the rail transporting means;

FIG. 2 is a plan view of the apparatus as shown in FIG. 1;

FIG. 3 is a plan view of the apparatus shown in FIG. 1 with the plurality of rails moved partially onto the transporting device;

FIG. 4 is a plan view of the rail transporting device loaded with ribbon rail and depicting the reaction of the ribbon rails as a corner is being traversed by the transporting means;

FIG. 5 is a perspective view of one means used to grip the ends of a plurality of ribbon rails for moving them from storage onto a transporting device;

FIG. 6 is a plan view of one means which may be used for guiding the rails from the storage area to the transporting device;

FIG. 7 is an enlarged view through FIG. 5 along lines 7—7, depicting the rail securing mechanism;

FIG. 8 is a sectional view along lines 8—8 of the guide means shown in FIG. 6;

FIG. 9 is an enlarged view along lines 9—9 of a portion of the rail guide means shown in FIG. 6;

FIG. 10 is a planar view of the rail hold down device;

FIG. 11 is a side elevation partially broken away of the apparatus used for pulling the rails onto the transporting means; and FIG. 12 is a section along lines 12—12 of FIG. 3.

As seen in FIGS. 1–3, the rail handling system comprises a general storage area S whereat a plurality of ribbon rails will be placed in parallel stacks of predetermined width. The width will normally be an even multiple of the number of rails capable of simultaneous handling. Depending upon the most common mode of transportation for these rails, the storage area may be adjacent to a ramp R upon which guides G are placed. The purpose for the ramp R is to raise the ribbon rails to the appropriate height for loading onto the conveying means which in the drawings is illustrated as a plurality of gondola cars B. In this particular configuration, the loader L is likewise attached to a gondola car which in turn is motivated by a railroad engine E. The motivating means could easily be the same engine used to tow the gondola cars when loaded with ribbon rails.

FIG. 3 shows, as noted above, the plurality of rails while in the process of being pulled up onto the top of the plurality of interconnected gondola cars B.

FIG. 4 is illustrative of one method of attaching the plurality of rails to the tops of the gondola cars wherein the ends of the rails are slidably secured to the end most cars and the centers of the rails are secured to an appropriate central car. This means of attachment allows the maximum amount of freedom whereby the transporting means can navigate corners, hills and the like and the rails will bend and flex with the carrier without leaving the transporting means. It is immediately obvious that gondola cars are illustrative only of a method of transporting the rails and could easily be replaced with a plurality of wheeled trailers, flat cars or, where appropriate, trailers on skids.

A means for properly spacing the rails while at the same time securely grasping them so that they may be pulled from the storage area through the guide means and onto the transporting means is illustrated in FIG. 5 and generally designated as 1. The main structure comprises an elongated hollow bar 2 having a plurality of holes 3 located in pairs along a pair of parallel lines which are likewise parallel to the longest dimension of the bar 2. Mounted to one edge of the bar 2 are a pair of hooks 4 through which a cable may be secured for purposes to be later described. Mounted to the top of the bar 2 are a pair of upstanding brackets 6 which in turn comprise a pair of triangular shaped protrusions 8 each having an eye 10 in the outermost corner. Mounted so that it protrudes through each of the plurality of parallel holes in the bar 2 is a nut and bolt combination 14. Each nut and bolt is rigidly secured to an elliptical hold down unit 16 having a necked down circular portion 17 (see FIGS. 7 and 9).

In operation, the rail spacing and grasping apparatus or fixture is placed upon the top of the stack of rails at least as many rails in width as there are spaces between the pairs of hold downs 16. When the fixture is being placed on top of the stack of rails the elliptical hold down units 16 are placed with their major axes parallel to the ribbon rails. Once the fixture is in place, generally perpendicular to the rails, the hold down units are turned 90° such that the major axes of the hold down is perpendicular to the ribbon rails thus extending under the flange of the rail r as seen in FIG. 7. The hold down units are shown without a turning means but can be turned with a wrench or alternatively a handle may be provided.

Because of the length of the rails involved and likewise because many times there will be a necessity of raising the rails to a height substantially above the level of storage, it is necessary to have one or more guide means which either function solely as guide means or additionally serve a secondary function of raising the rails to the height of the transporting means. A guide means which may well be used for this purpose is shown in FIGS. 6, 8 and 9.

As seen in FIG. 8, the guide means is designed to rest upon a pair of rails 30 which serve as supports for the guide means as well as providing a support and guide for use when moving the guide means from a position in front of one stack of stored rails to a position in front of another parallel stack. The guide means may thus be quickly and accurately moved from stack to stack. The guide means itself comprises a hollow rectangular frame element 32 which is of a width sufficient to overlie the parallel rails 30 and sufficiently long to accommodate the number of ribbon rails r which are to be loaded onto the transporting means. For added strength the body of the rectangular frame member is supported by a circular rigidifying element 34 underlying the central portion of the guide means and extending between the rails. The rigidifying element 34 serves the function of retaining the guide means in a position generally overlying the rail structure 30 during any sideward stress without resisting a twisting movement and further serves to retain the mechanism in proper position during movement between stacks of rails.

Mounted on top of the frame 32 is an inverted channel member 36 secured in a position substantially parallel to the longer sides of the frame member and midway therebetween. Mounted to the inside of the inverted channel member 36 and extending upwardly from the base are a plurality of upright elements 38 which have bores therein and provide supports for an axle 40 having mounted thereupon a plurality of flanged wheels 42. The flanged wheels 42 are each of sufficient width to support and guide one of the ribbon rails and there are a sufficient number of wheels 42 to accommodate the number of rails which may be handled by the transporting means.

Hingedly mounted to the guide means at a position wherein it overlies the inverted channel member 36 is an upper guide member 50 having a hinged mounting 52 at one end thereof and further having a pneumatic ram 54 approximately placed adjacent the hinge for assistance in opening and closing the guide member. The guide member 50 itself comprises a pair of channel members 55 which are secured in a spaced relation facing outwardly. Mounted between the backs of the channel members 55 is a single vertically disposed wheel 57 having an axis parallel to members 55 for each of the ribbon rails to be accommodated by the guide as well as a pair of horizontally disposed wheels 56 (see FIG. 9) which serve as guides for the sides of each of the ribbon rails to be accommodated by the guide.

For purposes of safety as well as for purposes of ease in placing the ribbon rails in their respective slots within the guiding means, the area between the inverted channel member 36 and the frame member 32 is covered by a shield 58 which appropriately slopes from the low point of the guide member adjacent frame member 32 to the high point of the lower portion of the guide member which is above the legs of the channel member 36 and adjacent the flanged wheels 42. Shield member 58, as mentioned above, provides a means for prohibiting objects from falling down beneath the guide member and likewise serves as a handy means for guiding and assisting the end of the ribbon rail up to the height of the flanged wheel 42.

It is well within the scope of one skilled in the art to note that the guide members will and shall be appropriately placed at heights which will accommodate both the relative height of the stack of ribbon rails which are being used and placed in a position appropriate to the relative height of the transporting means. If it is necessary as is in the case of the illustrative drawings, a ramp R will be placed adjacent the end of the storage means to raise the rails to the appropriate height of the transporting means.

The rail loading device itself as shown in FIGS. 11 and 12 is illustrated as mounted upon a modified hopper car since in the illustrative system the ribbon rails are likewise carried upon modified hopper cars. The use of the modified hopper car to carry the loader in the illustrative mechanism is simply a means of a convenient carrier and appropriate height for loading the rails onto the transporting device.

As seen in FIG. 11, the gondola car 59 has been modified to the extent that a pair of platforms 60 have been placed appropriately supported upon the base of the gondola car. Mounted to the top of each of the platforms 60 is a pneumatic ram 62 having an eye in the outer end of its piston arm 64. Extending above the normal top surface of the hopper car in a generally vertical orientation are a pair of structural members 66 one on each side of the car at the same relative position along the length of the car. Each of the members 66 has an outwardly extending flange 68 for purposes to be later described. The two structural members 66 are appropriately joined together by a bridging I-beam 70 in a generally horizontal orientation. Perpendicular to the upright member 66 are a pair of outwardly extending beams 72 which are mounted to the structural member 66 by a plurality of wheels 74 mounted on opposite sides of the flange members 68 such that the flange members 68 serve as a guide and control means for the wheels 74 of the beams 72. It will be noted in FIG. 12 the wheels 74 are mounted to a cart-like structure or trolley 75 which has a downwardly extending rod 78 appropriately pinned to the piston rod 64.

Likewise mounted upon the cart structure 75 are a plurality of flanges 80 having a hole therein through which a hinge pin is placed securing the beam 72 having complementary extensions 81 with holes hingedly secured to the hopper car. The hinged connection allows the beam to be pivoted to a position parallel to the sides of the hopper car streamlining the apparatus for ease in transporting the loader from site to site.

Located at the outward end of the beam 72 is a flange 82 which has connected thereto a cable 84 which extends over an upright 86 across the hopper car and down to the upwardly extending flange 76 of the cart mounted upon the opposite upright 66. The combination is such that the beams when extending on opposite sides of the gondola car are interconnected by cable 84. The interconnection of the two beams serve two separate and distinct purposes, the first being the provision of additional support for the beam in use thus relieving some of the stress and strain from the trolley 75 mounted upon the flange 68 and, the second being that each beam serves as a counter balance for the beam on the opposite side of the car. One beam will not be used as a loading beam without the beam on the opposite side of the car extending into its outright position. When both beams are in their outright position, the hopper car, or other supporting means for the loading mechanism, will have much less tendency to tip or sway thus providing much greater accuracy during the loading of the rails.

Located on each of the outwardly extending beams 72 are a pair of downwardly extending flanges 92 and a pneumatic ram 90. Referring now specifically to the right hand side of FIG. 12, there is shown a beam in use with a loading fixture 1. It is to be noted that the upper portion of the hopper car in this case is provided with a plurality of flanged rollers 110. The ribbon rails roll between the flanges of the rollers 110 and likewise are held in position by the same flanges during transportation of the ribbon rails from the storage site to the appropriate placement site. As shown in FIG. 12, the upwardly extending protrusions 8 on the bar 2 of the rail grasping apparatus or fixture straddle the downwardly extending brackets 90 on the beam 72 and are pinned in place. The ram 92 is appropriately connected to a bracket 93 on bar 2 such that lateral adjustment of the loading and grasping apparatus may be made assuring that the ribbon rails will properly rest within the flanges of the spool rollers 110 on top of the hopper car being loaded.

Referring to FIG. 11, it will be seen that each of the beam 72 is supported on the trolley car 75 as previously mentioned and is positioned at the appropriate height during loading by the pair of pneumatic rams 62 carried by the platforms 60 and connected to the trolley 75 (FIG. 12). The uprights 66 are further braced and reinforced by a pair of beams 100 extending downwardly and outwardly from the upper portion of the uprights 66 forming a triangular structure based upon the sides of the hopper car. Since the outwardly extending beam 72 will be subjected to a turning moment about its hinged connection 80, 81 during the loading operation, a cable support 102 is secured between the outermost end of the beam 72 and an anchor point on the gondola car. The loader can selectively be operated from either side and used with the load force from either end of the loader so that the cable 102 will be appropriately attached to resist the turning moment.

In operation, as will best be understood from the sequence of FIGS. 1–4, the plurality of ribbon rails are stacked in piles of appropriate width in the storage area marked S in FIG. 1. When it is necessary to have a plurality of the rails at a site for repair or building, an appropriate transporting means, in this case a plurality of gondola cars marked B are backed into position adjacent the end of the storage area with the transporting means being generally aligned with the longitudinal axes of the ribbon rails. Appropriate guide means G (FIGS. 6, 8 and 9) are placed between the ends of the ribbon rails and the adjacent end of the transporting means. A loading mechanism L (FIGS. 11 and 12) is backed into position generally adjacent the end car of the transporting means as illustrated in FIGS. 1 and 2. A rail grasping and transporting apparatus 1 is placed upon a top layer or portion thereof of the ribbon rails and the bar 2 (FIGS. 5, 7 and 10) secured in place as described above. A cable is passed from the beam 72 of the loading mechanism back to the hooks 4 of the bar 2 and some appropriate power source, shown as a railroad engine E in the illustrative mechanism is used to pull the loading mechanism forward. The ribbon rails to which the apparatus is attached are pulled through the guide means to a position where the fixture 1 may be firmly secured to the beam 72 by means of appropriate pins and brackets 10 and 90 (FIG. 12). Once the fixture is secured to the beam 72 of the loader L and laterally positioned by the ram 92 the power source is engaged and moved slowly along a track parallel to the transporting means moving the entire group of rails up onto the transporting means. Once the layer of rails is located with its entire length upon the transporting means, the rails are appropriately secured and moved to the sites of use. It can thus be seen that the simultaneous loading and transporting of a plurality of rails yields substantial economy in time savings alone.

It will be obvious that although the mechanism is shown as used with a railroad engine and with gondola cars, it could be used equally well with trucks or other appropriate transporting means. Further modifications, such as the height of the loading mechanism to accommodate the various heights of the transporting means and the like, to satisfy particular installations or applications may be made without departing from the spirit and scope of the invention.

The embodiments of the invention in which an exclusive property or privilege is claimed are defined as follows:

1. An apparatus for use in a rail handling operation to simultaneously move one or more parallel stacked units of ribbon rail strands from a storage area onto wheeled transport means positioned essentially parallel to and forward of the stack of rail strands, each rail unit comprising ribbon rail strands layed in closely spaced side-by-side relation to each other, comprising:
  guide means positioned between the end of the stack of parallel rails and the transport means to guide the rails from the storage area onto the transport means,
  a loading means adapted to move along a track extending alongside of and parallel to the transport means and stack of ribbon rail strands, the loading means including (1) a frame having wheels resting on the track, (2) power means to effect movement of the frame, (3) vertically adjustable arms extending outwardly from each side of the frame essentially opposite one another and (4) power means operatively attached to the arms for effecting vertical movement thereof,
  clamping means including (1) an elongated frame member spanning at least the width of a rail unit, (2) a plurality of gripping means for gripping each of the rails in the unit extending downwardly from the frame at spaced intervals between each of the rails, the gripping means adapted to move between a position gripping the rails and a release position,
  means on the arms of the loading means and frame member of the clamping means for detachably securing the clamping means to the arm for movement therewith so that the clamping means with the rail unit clamped thereto can be secured to the arm of the loading means and the loading means moved to pull the rail unit onto the transport means.

2. The apparatus of claim 1 wherein a powered ram is mounted on each of the arms of the loading means with the pistons thereof detachably securable to the clamping means for effecting horizontal movement thereof to shift the clamped rail unit in a horizontal direction as desired for loading onto the transport means.

3. Apparatus for transporting one or more layered units of substantially parallel ribbon rail strands, each unit comprising rails closely spaced in side-by-side relation to each other, from a storage area onto transporting means for supporting the rail units and transporting them to a use location, comprising:
  1. a wheeled, powered loading means having at least one vertically adjustable arm extendable above the ribbon rail unit;
  2. clamping means including a frame member spanning at least the width of a rail unit, a plurality of gripping means for gripping each of the rails in a unit extending downwardly from the frame member at spaced intervals between each of the rails, the gripping means adapted to move between a position gripping the rails and a release position;
  3. power means operatively connected to the loading means for effecting vertical movement of the arm;
  4. drag line means connected to the frame member extending to the arm for pulling and lifting said clamping means and rail unit to a coupling position beneath the arm; and
  5. means on the arm and the clamping means for detachably securing the clamping means to the arm when the clamping means is in the coupling position, whereby the clamping means with the rail unit gripped thereby may be secured to the arm of the loading means and the loading means moved to pull the rail unit onto the transporting means.

4. The apparatus of claim 3 including:
  a powered ram mounted on said arm and detachably securable to the frame member of the clamping means for acting therebetween to effect horizontal movement of the frame member to shift the clamped rail unit in a horizontal direction for loading onto the transport means.

* * * * *